(12) United States Patent
Qumei

(10) Patent No.: US 7,739,679 B2
(45) Date of Patent: Jun. 15, 2010

(54) OBJECT ORDERING TOOL FOR FACILITATING GENERATION OF FIRMWARE UPDATE FRIENDLY BINARY IMAGE

(75) Inventor: Iyad Qumei, Huntington Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 776 days.

(21) Appl. No.: 11/100,305

(22) Filed: Apr. 6, 2005

(65) Prior Publication Data

US 2007/0079306 A1 Apr. 5, 2007

Related U.S. Application Data

(60) Provisional application No. 60/559,750, filed on Apr. 6, 2004.

(51) Int. Cl.
*G06F 9/45* (2006.01)

(52) U.S. Cl. ............... 717/170; 717/171; 717/175; 717/176

(58) Field of Classification Search ........... 717/168–173
See application file for complete search history.

(56) References Cited

U.S. PATENT DOCUMENTS

| | | | |
|---|---|---|---|
| 5,261,055 A | 11/1993 | Moran et al. | |
| 5,442,771 A | 8/1995 | Filepp et al. | |
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |
| 5,878,256 A | 3/1999 | Bealkowski et al. | |
| 5,960,445 A | 9/1999 | Tamori et al. | |
| 6,009,497 A | 12/1999 | Wells et al. | |
| 6,038,636 A | 3/2000 | Brown, III et al. | |
| 6,052,531 A * | 4/2000 | Waldin et al. ............. | 717/170 |
| 6,064,814 A | 5/2000 | Capriles et al. | |
| 6,073,206 A | 6/2000 | Piwonka et al. | |

(Continued)

FOREIGN PATENT DOCUMENTS

CA 2339923 A 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Wei Y Zhen
*Assistant Examiner*—Matthew J Brophy

(57) ABSTRACT

An object ordering tool analyzes output from a linker to determine ordering of code objects in first and second firmware binary images. The tool produces a linker script file used by the linker to link the code objects of the second firmware binary image in a more optimal order for production of updating information used in the electronic device for updating firmware of the electronic device.

19 Claims, 8 Drawing Sheets

U.S. PATENT DOCUMENTS

| | | |
|---|---|---|
| 6,073,214 A | 6/2000 | Fawcett |
| 6,088,759 A | 7/2000 | Hasbun et al. |
| 6,105,063 A | 8/2000 | Hayes, Jr. |
| 6,112,024 A | 8/2000 | Almond et al. |
| 6,112,197 A | 8/2000 | Chatterjee et al. |
| 6,126,327 A | 10/2000 | Bi et al. |
| 6,128,695 A | 10/2000 | Estakhri et al. |
| 6,157,559 A | 12/2000 | Yoo |
| 6,163,274 A | 12/2000 | Lindgren |
| 6,198,946 B1 | 3/2001 | Shin et al. |
| 6,279,153 B1 | 8/2001 | Bi et al. |
| 6,311,322 B1 | 10/2001 | Ikeda et al. |
| 6,374,250 B2 * | 4/2002 | Ajtai et al. ............. 707/101 |
| 6,438,585 B2 | 8/2002 | Mousseau et al. |
| 6,535,894 B1 * | 3/2003 | Schmidt et al. ............. 707/204 |
| 6,694,336 B1 * | 2/2004 | Multer et al. ............. 707/201 |
| 6,925,467 B2 * | 8/2005 | Gu et al. ............. 707/101 |
| 6,990,656 B2 * | 1/2006 | Ersek et al. ............. 717/121 |
| 7,194,728 B1 * | 3/2007 | Sirota et al. ............. 717/106 |
| 7,313,791 B1 * | 12/2007 | Chen et al. ............. 717/170 |
| 2001/0029178 A1 | 10/2001 | Criss et al. |
| 2001/0047363 A1 | 11/2001 | Peng |
| 2001/0048728 A1 | 12/2001 | Peng |
| 2002/0078209 A1 | 6/2002 | Peng |
| 2002/0116261 A1 | 8/2002 | Moskowitz et al. |
| 2002/0131404 A1 | 9/2002 | Mehta et al. |
| 2002/0152005 A1 | 10/2002 | Bagnordi |
| 2002/0156863 A1 | 10/2002 | Peng |
| 2002/0157090 A1 | 10/2002 | Anton, Jr. |
| 2003/0033599 A1 | 2/2003 | Rajaram et al. |
| 2003/0037075 A1 | 2/2003 | Hannigan et al. |
| 2003/0061384 A1 | 3/2003 | Nakatani |
| 2004/0098427 A1 * | 5/2004 | Peng ............. 707/205 |

FOREIGN PATENT DOCUMENTS

| | | |
|---|---|---|
| JP | 8202626 A | 8/1996 |
| KR | 2002-0034228 A1 | 5/2000 |
| KR | 2001-0100328 A1 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

Generator uses information created by the Object Ordering Tool

300

```
LOAD_REGION_1  [Load Base Address] [Region MAX Size]
{
      EXEC_REGION_1 [Execution Base Address] [Region MAX Size]
      {
         object.o (Attributes)
         library.o(Attributes)
         * (+RO)   ; Code
      }
      EXEC_REGION_2 [Execution Base Address] [Region MAX Size]
      {
         object.o (Attributes)
         library.o(Attributes)
         * (+RW)   ; Data
      }
      EXEC_REGION_2 [Execution Base Address] [Region MAX Size]
      {
         object.o (Attributes)
         library.o(Attributes)
         * (+ZI)            ; Uninitialized, Zero
      }
}

LOAD_REGION_2  [Load Base Address] [Region MAX Size]
{
      EXEC_REGION_1 [Execution Base Address] [Region MAX Size]
      {
         object.o (Attributes)
         library.o(Attributes)
         * (+RO)   ; Code
      }
      EXEC_REGION_2 [Execution Base Address] [Region MAX Size]
      {
         object.o (Attributes)
         library.o(Attributes)
         * (+RW, +ZI)     ; Data
      }
}
```

Figure 4A

```
SECTIONS   [Virtual Memory Address] :[AT Load Memory Address]
{
      . = Code Base Address
      .text : {
          object.o
          library.o
          * (.text)
      }
      . = Data Base Address
      .data : {
          object.o
          library.o
          * (.data)
      }
      .bss : {
          object.o
          library.o
          * (.bss)
      }
}

MEMORY
{
      ROM (RX) : ORIGIN = Base Address, LENGTH = Memory Device Size
      RAM (RW) : ORIGIN = Base Address, LENGTH = Memory Device Size
}
```

OBJECT ORDERING TOOL FOR FACILITATING GENERATION OF FIRMWARE UPDATE FRIENDLY BINARY IMAGE

RELATED APPLICATIONS

This patent application makes reference to, claims priority to and claims benefit from U.S. Provisional Patent Application Ser. No. 60/559,750, entitled "OBJECT ORDERING TOOL FOR FACILITATING GENERATION OF FIRMWARE UPDATE FRIENDLY BINARY IMAGE", filed on Apr. 6, 2004, the complete subject matter of which is hereby incorporated herein by reference, in its entirety.

This patent application makes reference to U.S. patent application Ser. No. 10/646,230, entitled "MOBILE HANDSET UPDATE PACKAGE GENERATOR THAT EMPLOYS NODES TECHNIQUE", filed on Aug. 22, 2003, the complete subject matter of which is hereby incorporated herein by reference, in its entirety.

The present application also makes reference to PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

The present application also makes reference to U.S. Provisional Patent Application Ser. No. 60/249,606, entitled "System and Method for Updating and Distributing Information", filed Nov. 17, 2000, the complete subject matter of which is hereby incorporated herein by reference, in its entirety.

The present application also makes reference to U.S. Pat. No. 6,832,373, entitled "System and Method for Updating and Distributing Information", issued Dec. 14, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs and a device management (DM) server often facilitates bug fixing operations. It is often not clear who should pay for the ensuing data traffic. It is also not clear how a carrier network can support different billing models when it comes to data traffic due to device management activities.

Differencing algorithms are typically used in a generator that is employed to create update packages for updating firmware and software in devices, to generate difference information that are packaged in update packages. For several reasons, it is desirable for update packages to be small. Unfortunately, there is only so much that can be done by differencing algorithms used in present-day generators. There is a problem of getting the update packages to be small when the differencing algorithms, and generators in general, cannot make them any smaller or any more compact.

It is often difficult to compress an update package into a manageable size. The same compression problem is encountered in the generation of new update packages from a pair of old and new firmware versions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for generating updating information for updating code in an electronic device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4A is a listing of an exemplary linker script file describing memory layout and mapping rules for the ARM Developer Studio (ADS), from ARM Ltd., for example object and library binary image files, in accordance with a representative embodiment of the present invention.

FIG. 4B is a listing of an exemplary linker script file describing memory layout and mapping rules for the GNU GCC linker, for example object and library binary image files, in accordance with a representative embodiment of the present invention.

DETAILED DESCRIPTION OF THE INVENTION

The present invention relates generally to the generation of update packages for firmware and software updates for mobile devices. More specifically, representative embodiments of the present invention relate to a method of generating information to enable an object code linker to produce a binary image that results in a more compact update package. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices having a processor with memory containing firmware and/or software.

Figure 1:
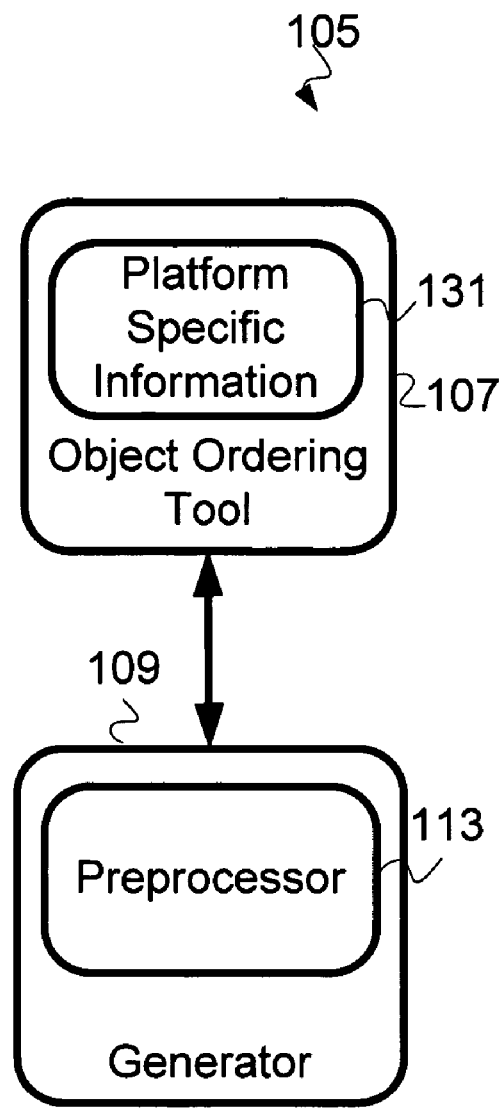
FIG. 1 is a perspective diagram of an update package generation environment that comprises an object ordering tool and a generator, in accordance with a representative embodiment of the present invention.

FIG. 1 is a perspective diagram of an update package generation environment 105 that comprises an object ordering tool 107 and a generator 109, in accordance with a representative embodiment of the present invention. The object ordering tool 107 may employ platform specific information 131 related to, for example, the processor used in the electronic device to be updated, and to code development tools used to produce firmware and/or software for the electronic device. The generator 109 may comprise a preprocessor 113 capable of adapting firmware and/or software used by the generator 109 in the production of an update package used by the electronic device for updating firmware and/or software in the electronic device. The firmware and/or software in a mobile electronic device may comprise a number of code objects. During the development of an updated version of code for the mobile electronic device, one or more of the code objects may change. The object ordering tool 107 may be capable of generating object ordering information that may be subsequently employed in the generator 109 to generate compact update packages for updating firmware and/or software in mobile electronic devices such as, for example, mobile handsets, personal digital assistants, pagers, and/or personal computers (PCs). In a representative embodiment of the present invention, an update package used for updating firmware and/or software in a mobile electronic device may comprise a set of executable instructions for converting or transforming a first version of code to a second, updated version of code. Additional details regarding the content and generation of update packages may be found in U.S. Pat. No. 6,832,373, entitled "System and Method for Updating and Distributing Information", issued Dec. 14, 2004, the complete subject matter of which is hereby incorporated herein by reference, in its entirety.

In accordance with a representative embodiment of the present invention, the object ordering tool 107 may employ platform specific information 131 to determine an object ordering information that is subsequently communicated to the generator 109 to facilitate the generation of compact update packages. In a representative embodiment of the present invention, an object ordering tool such as, for example, the object ordering tool 107 may be employed in the processing of an old version of firmware (a.k.a., software, code) and a new version of firmware, to determine a more optimal ordering of code objects. Such information may be employed in creating linker script information used in re-building a new image of firmware/software that results in a more compact update package. Such object ordering information may be saved for subsequent use during a later generation activity, when an even more recent version and the new version may be used to generate a more current update package.

In a representative embodiment of the present invention, a generator such as, for example, the generator 109 may employ differencing techniques to compare one version of code (e.g., firmware and/or software), that may be referred to herein as the old version, to another version of the code, that may be referred herein as the new version. The generator 109 may produce difference information that is then compressed and packaged into an update package. The update package may then be delivered to a mobile electronic device using, for example, over-the-air (OTA) messaging techniques.

In a representative embodiment of the present invention, the difference information produced by the generator 109 may be made more compact by reordering at least one code object, module, or component in the new version of firmware/software, to conform to an order determined in the old version of the firmware/software. In one representative embodiment of the present invention, such reordering may occur prior to the generation process conducted by the generator 109. In another representative embodiment of the present invention, such reordering may occur as part of the generation process conducted by the generator 109.

Conventional firmware build procedures, in particular the linking phase, may create firmware binary images that are not appropriate for Over-the-Air (OTA) update techniques. The linker tool used to resolve address references between code object or module may organize firmware content that is optimized for reduced binary image foot print, or for shortest execution time. In doing so, the linker tool may produce a binary image that is sub-optimal for the generation of compact update packages desirable for use in updating the associated mobile electronic device.

Maintaining consistent firmware binary image content between consecutive firmware builds is important for at least the following reasons:

1. generating differencing information comprising the smallest quantity of binary image differences as possible, and
2. minimizing update time by concentrating changes to the fewest number of flash memory sectors.

A representative embodiment of the present invention provides a technique to order code objects in a binary image during the link phase in a fashion that results in a more compact update package, and to maintaining this order through subsequent build procedures.

Figure 2:
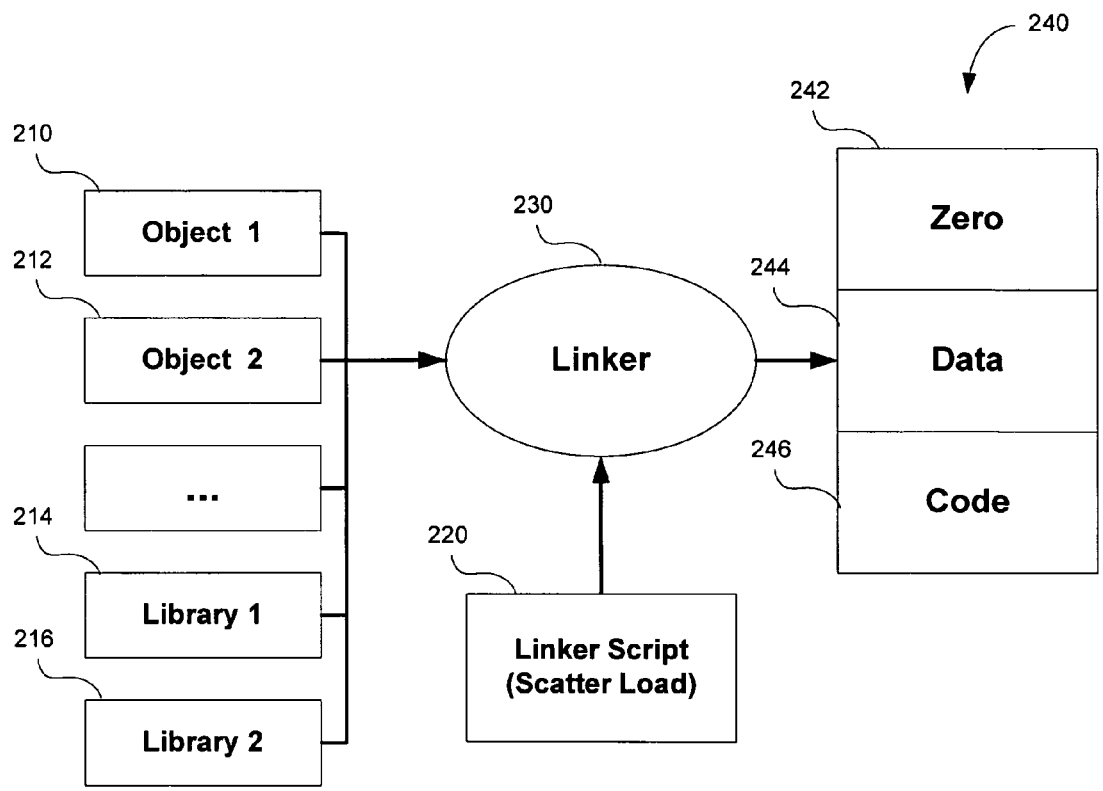
FIG. 2 illustrates the linking of a number of binary object files and code libraries, and a linker script as input to a linking tool to produce a binary image comprising a binary image portion for un-initialized (zero) read/write memory, initialized (data) read/write memory, and executable (code) memory, in accordance with a representative embodiment of the present invention.

FIG. 2 illustrates the linking of a number of binary object files 210, 212 and code libraries 214, 216, and a linker script 220 as input to a linking tool 230 to produce a binary image 240 comprising a binary image portion for un-initialized (zero) read/write memory 242, initialized (data) read/write memory 244, and executable (code) memory 246, in accordance with a representative embodiment of the present invention. Each of the binary object files 210, 212 may comprise a binary image having its own un-initialized (zero) portion, an initialized (data) portion, and an executable (code) portion. The binary object files 210, 212 may be created by compilation of software source code, while libraries 214, 216 may comprise binary archives of containing collections of binary object files, each having their own un-initialized (zero) portion, initialized (data) portion, and executable (code) portion. A typical function of a linker tool such as the linker tool 230 is to combine multiple binary objects and library files, in order to resolve address references between code objects or modules, and to map the location of various code objects to produce a binary image compatible with the memory layout of the target device. In assembling the binary image, the linker tool 230 may rearrange the individual portions of each of the object code files being linked. The linker script 220 may be used by the linker tool 230 to guide the linker tool 230 in the process of creating a binary image 240, by defining the memory layout and rules for mapping the different code objects/object files 210, 212 and libraries 214, 216 onto the memory layout of the target mobile electronic device. The output from the linker tool 230 is normally a binary image object representing the executable firmware as mapped onto the device memory according to the applied rules of the linker script 220.

Figure 3:
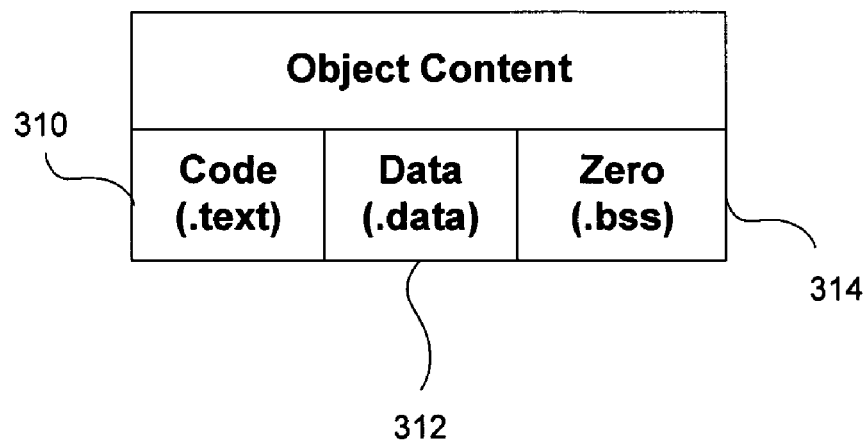
FIG. 3 shows a block diagram illustrating the three components or portions of an object file employed by a linker tool such as, for example, the linker tool of FIG. 2, in accordance with a representative embodiment of the present invention.

FIG. 3 shows a block diagram illustrating the three components or portions of an object file 300 employed by a linker tool such as, for example, the linker tool 230 of FIG. 2, in accordance with a representative embodiment of the present invention. As described above, the object file 300 comprises three portions, a code or executable binary image portion 310, a data or initialized binary image portion 312, and an un-initialized binary image portion 314. Other names may be used to refer to similar portions of an object file, and a different complement of memory portions or segments may be used without departing from the spirit and scope of the present invention. The code or executable binary image portion 310 may comprise executable instructions to be executed by the processor in the mobile electronic device. The data or initialized binary image portion 312 may comprise program storage whose values are defined in the source code from which the object file was generated. The un-initialized binary image portion 314 may comprise program storage whose values were not defined in the source code from which the object file was generated.

Linker scripts that guide linker tool operation such as, for example, the linker script 220 of FIG. 2, are implemented differently for different software development build tools.

FIG. 4A is a listing of an exemplary linker script file describing memory layout and mapping rules for the ARM Developer Studio (ADS), from ARM Ltd., for example object and library binary image files, in accordance with a representative embodiment of the present invention. A linker script file may also be reference to herein as a "scatter file". In the scatter (i.e., linker script) file of FIG. 4A, there are two memory regions into which firmware is to be loaded during transfer of a binary image onto the target mobile electronic device, LOAD_REGION_1 and LOAD_REGION_2. Each loading region is identified with a base address and maximum memory size. In addition, each load region comprises execution regions. The execution regions within each load region describe the remapping of the binary during execution. The illustration of FIG. 4A shows three execution regions EXEC_REGION_1, EXEC_REGION_2, and EXEC_REGION_3 defined within LOAD_REGION_1. The illustration also shows that LOAD_REGION_2 comprises execution regions EXEC_REGION_I and EXEC_REGION_2. Each execution regions is also identified with base address and maximum size. In addition, object files and libraries can be specified explicitly or implicitly in each execution region.

FIG. 4B is a listing of an exemplary linker script file describing memory layout and mapping rules for the GNU GCC linker, for example object and library binary image files, in accordance with a representative embodiment of the present invention. The memory map of the target processor is described with the MEMORY segment, showing a ROM (i.e., read-only) portion, and a RAM (i.e., read-write) portion, with corresponding ORIGIN (i.e., base addresses) and LENGTH (memory device size) parameters. The code and data layout in the binary image produced by the associated linker tool is mapped according to the rules defined in the SECTIONS segment. The SECTION segment comprises an executable (code) memory portion labeled ".text", an initialized (data) memory portion labeled ".data", and an un-initialized (zero) memory portion labeled ".bss". The organization/arrangement of code objects within a firmware/software binary image is controlled by the linker script or "scatter file". As described above, code object files and libraries may be specified explicitly or implicitly along, with their associated attributes.

In a representative embodiment of the present invention, the organization of code objects within firmware binary image content may follow the following mapping order:
   Read only (RO) Code
   Read only (RO) Data
   Read write (RW) data
   Un-initialized or zero initialized (ZI) Data The code portions within objects can be further identified by section. These sections may have unique names which may be used to further refine object ordering.

The linker may automatically generate special content (e.g., special instructions or data sequences) to extend branching range, and/or to change processor state through the creation of a "veneer". The location of this content may be automatically determined by the linker tool.

In a representative embodiment of the present invention, an object ordering tool may be employed to control the order of the objects in the binary image created by a linker tool. The following section describes the details of the tool implementation.

In a representative embodiment of the present invention, a linker script or "scatter file" may be generated by an object ordering tool, from mapping information (e.g., a MAP file) produced by the linker tool. The scatter file may be used as the linker script file when producing the binary image to be employed in generating the update package for updating the target mobile electronic device.

In a representative embodiment of the present invention, the object ordering tool may generate the scatter file using an initial survey of the code objects within a binary image. A linker output file, referred to as a "MAP" file, contains the information used by the object ordering tool. An object listing for a firmware binary image build may be parsed from the MAP file produced by the linker tool used during a firmware build. A MAP file is normally text-based; and its format varies between the linker tools of different build tool chains such as, for example, the GCC and ADS tool chains discussed previously. Therefore, a representative embodiment of the present invention may be capable of parsing MAP files for a variety of different tools chains, and may be capable of generating a scatter file for those same tool chains.

In a representative embodiment of the present invention, Object information extracted from the MAP file may be identified as having the following attributes:
   Object name.
   Base Address
   Object Type, Code, Data, Zero, .data, text, .bss
   Object Attribute, RO, RW, ZI, data, .text, .bss
   Section Name
   Parent library
   Loading Region
   Execution Region Input files to a linker tool such as, for example, the object files 210, 212 and library files 214, 216 used as input to the linker 230 of FIG. 2 may contain detailed information about symbols within the code objects that they represent, and which are used in the building of a binary image for an electronic device. Such symbol information may be used in the creation of binary difference information.

In some representative embodiments of the present invention, the MAP files produced by a linker tool may not explicitly contain symbol information. A representative embodiment of the present invention attempts to uniquely identify binary image content in two separate builds of a firmware.

The process of uniquely identifying binary image content within the MAP file may be performed according to the type of information present in the MAP file. In a representative embodiment of the present invention, information about object names, section names, object types and object attributes may be used to identify content for comparison. In some cases, these details may not be sufficient to uniquely identify content. In such situations, duplication may be eliminated by selecting the first occurrence of object information in the MAP file. The remaining object content may be listed automatically by the linker tool in the binary image.

Figure 5:
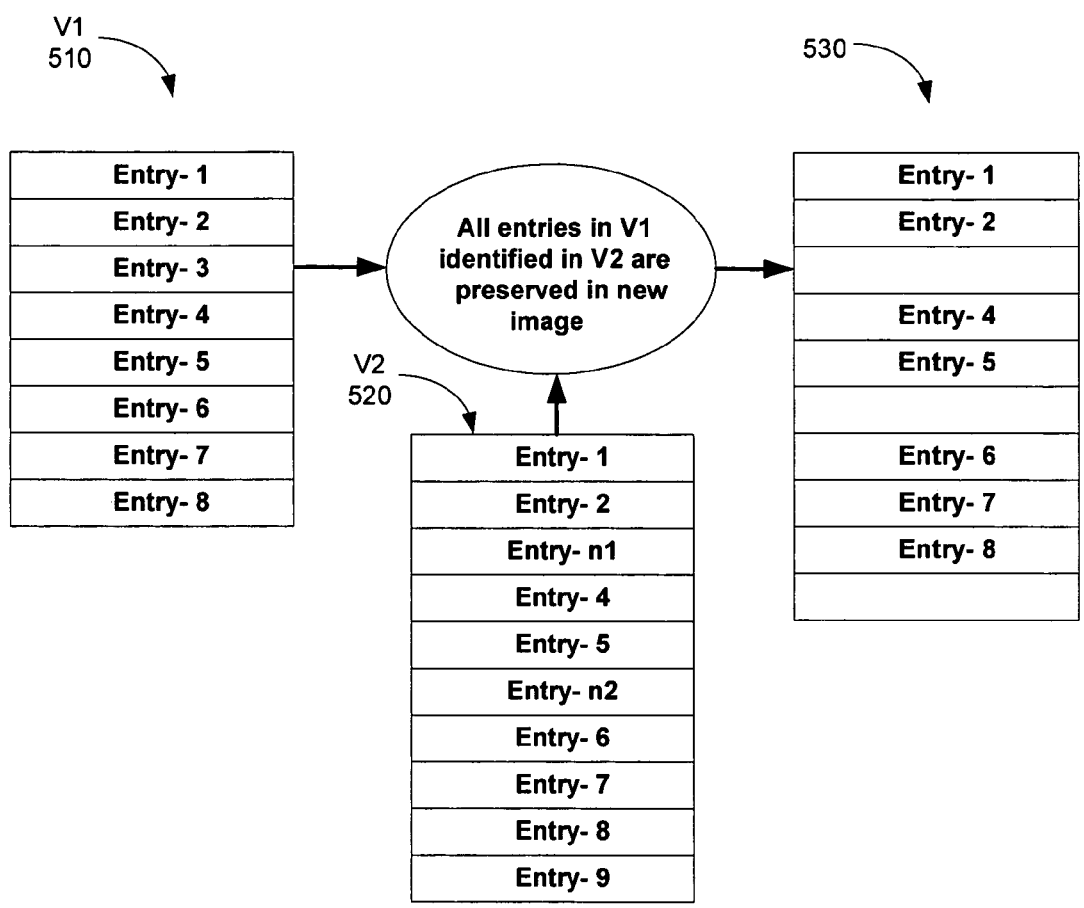
FIG. 5 illustrates an exemplary process of organizing objects to produce consistent firmware images suitable for binary differencing, in accordance with a representative embodiment of the present invention.

FIG. 5 illustrates an exemplary process of organizing objects to produce consistent firmware images suitable for binary differencing, in accordance with a representative embodiment of the present invention. The illustration shows a firmware version 1 V1 510 representing, for example, an existing or old version of firmware/software, for a mobile electronic device, and a firmware version 2 V2 520 representing, for example, a new or updated version of firmware software for a mobile electronic device. The firmware version 1 V1 510 may be processed ("linked") by a linker tool such as, for example, the linker tool 230 of FIG. 2 based upon existing rules, and a corresponding MAP file may be created. The firmware version 2 V2 520 may be processed by the linker tool 230 employing a generic linker script file, to create a corresponding MAP file. The generic linker script may contain minimal instructions to the linker tool, and may rely on the default operating options, parameters, or instruction to the linker tool to create the firmware binary image 530. The purpose of employing such an operating configuration for the linker tool is to survey all objects that are part of the firmware binary image.

A representative embodiment of the present invention may employ a two-phase approach. The illustration of FIG. 5 may represent the first phase, during which MAP files may be parsed and objects lists may be created for each of the firmware versions 1 V1 510 and 2 V2 520. The parsing tool may extract object information, and may list or catalog objects according to their base addresses. Object information entries that are not uniquely identified may be represented by the first entry in the MAP file. The firmware version 2 V2 520 object lists may be used as a baseline, to identify common entries with firmware version 1 V1 510. Objects that are common to both firmware versions may be added to a new, intermediate object list 530.

Figure 6:
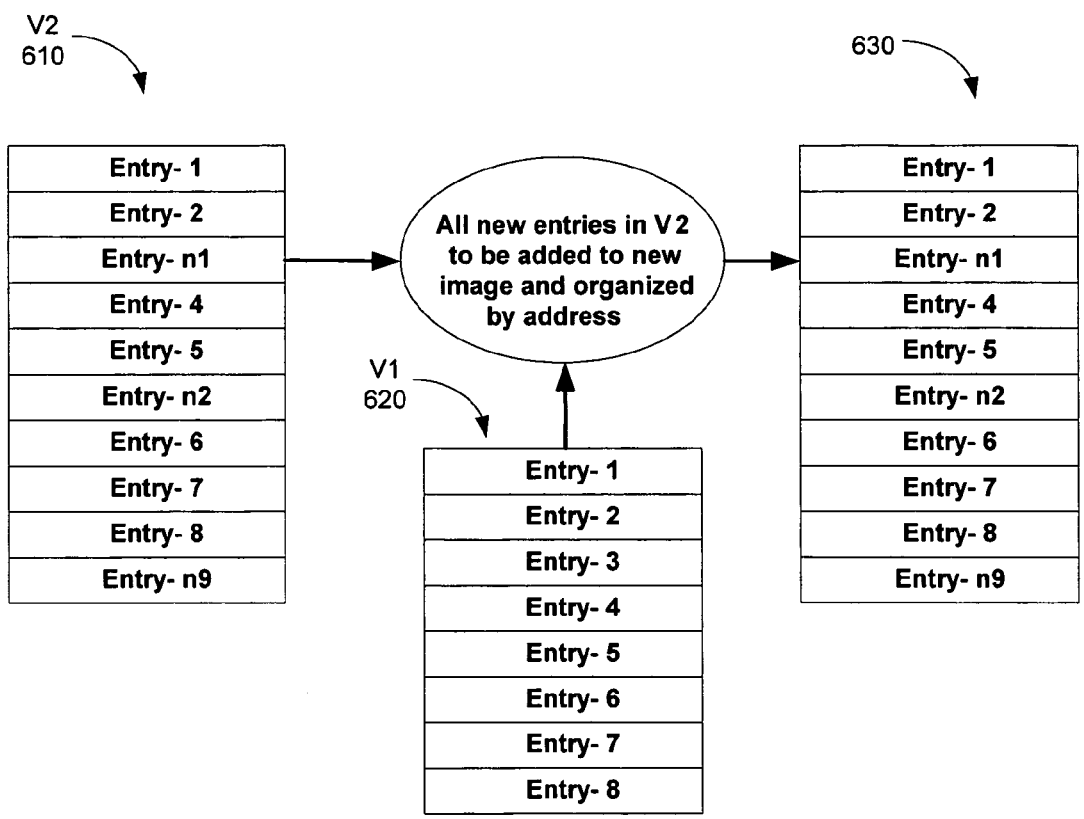
FIG. 6 illustrates a second phase of an exemplary process of organizing objects to produce consistent firmware images suitable for binary differencing, in accordance with a representative embodiment of the present invention.

FIG. 6 illustrates a second phase of an exemplary process of organizing objects to produce consistent firmware images suitable for binary differencing, in accordance with a representative embodiment of the present invention. The illustration of FIG. 6 shows how a comparison of object information may be repeated with a purpose of identifying new objects introduced in the second firmware version. In the illustration of FIG. 6, the objects listed for firmware version 1 V1 620 may be used as the baseline. The objects in the list for firmware version 2 V2 610 that are not present in the list for firmware version 1 V1 620 may be added to the intermediate list 530 of FIG. 5, to create a final object list 630.

The new object list 630 may provide information used to construct a linker script file employed in the building of firmware version 2. In a representative embodiment of the present invention, two approaches may be employed in adding objects to the linker script file.

In the first approach, new objects in firmware version 2 may be added to the linker script file, based upon their base address. This approach may maintain the original linker ordering rules, hence minimizing alteration to the original binary optimization such as, for example, memory space or speed of execution. Such an approach may not be suitable for minimizing the amount of time used in performing an update of the firmware in the mobile electronic device.

A second approach may be employed that concentrates change due to the presence of new objects to a particular region of the firmware binary image. This approach maintains locality of references within individual flash sectors. In a representative embodiment of the present invention, use of this approach may result in all new objects being added at the end of the binary image for a flash sector.

Similar procedure may be applied to object archives such as, for example, libraries, to control ordering of content at the library level.

In a representative embodiment of the present invention, a variety of other objects may automatically be introduced by the linker tool to the firmware binary image. Such objects may include "veneer" code, as well as linker-generated symbols to identify memory regions and memory limits such as, for example, stack and heap memory locations, and RAM and ROM/flash memory boundaries. Veneer code may be created for extending the range of branches, and to change processor state. Such information may be location-critical. Hence, in employing a representative embodiment of the present invention, care may be taken in locating these types of objects within the firmware image.

Figure 7:
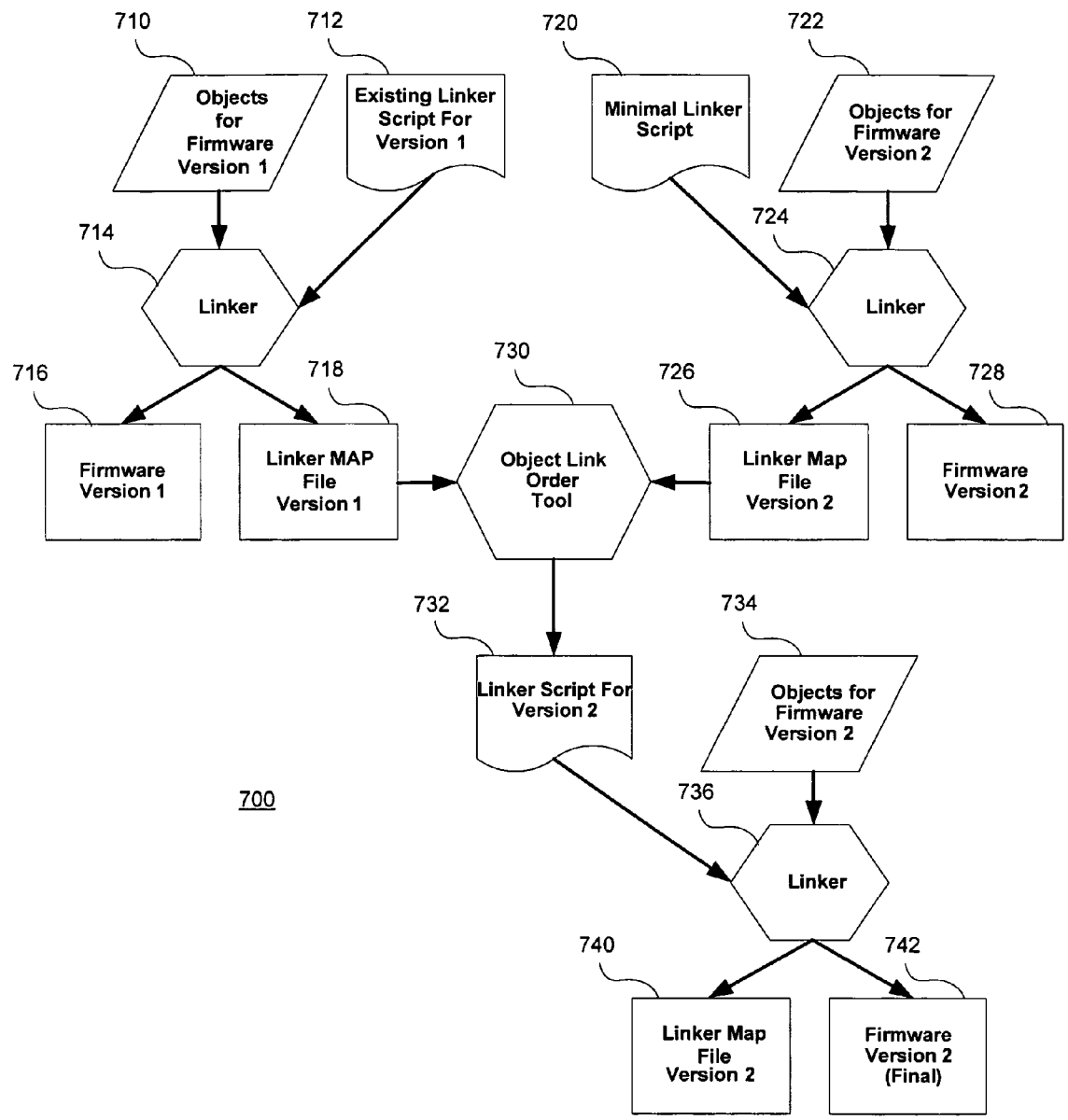
FIG. 7 shows a work flow diagram for a method of using an exemplary object link order tool, in accordance with a representative embodiment of the present invention.

FIG. 7 shows a work flow diagram 700 for a method of using an exemplary object link order tool, in accordance with a representative embodiment of the present invention. The steps of the method and work flow are described as follows. To begin, a linker tool at 714 such as, for example, the linker tool 230 of FIG. 2 may be used to link the objects for firmware version 1 710, using the existing linker script for firmware version 1 712. The linker tool at 714 produces as output firmware version 1 716, and a linker MAP file 718 for firmware version 1. Next, a linker tool at 724 that may, for example, be the same linker tool used at 714, may be used to link object for firmware version 2 722, using a minimal linker script 720. The linker tool at 724 may produce as output firmware version 2 728, and a linker MAP file 726 for firmware version 2.

Next, the linker MAP file 718 for firmware version 1, and the linker MAP file 726 for firmware version 2 are used as input to an object link order tool in accordance with a representative embodiment of the present invention, at 730. As described above, the object link order tool at 730 parses the MAP files 718, 276 for the two firmware versions, and determines an object list for the firmware version 2. The object link order tool then organizes objects according to object base addresses, positioning new object last in the binary image, maintaining locality of objects within flash sectors. Next, The object link order tool at 730 produces as output a new linker script file 732 for the linking of firmware version 2. This new linker script file 732 for firmware version 2 is then input to a linker tool at 736 that may, for example, be the same as the linker tool used at 714 and 724, along with the objects for firmware version 2 734. The linker tool at 736 then links the objects for firmware version 2 734, and produces as output a linker MAP file 740 for firmware version 2, and a firmware version 2 binary image 742. Although not shown, the steps above may be repeated for subsequent builds.

Aspects of the present invention may be found in a system for generating updating information for updating code in an electronic device. Such a system may comprise a server having stored thereon a first binary memory image comprising a first plurality of code objects, and object ordering software executable on the server, the object ordering software capable of determining an object order in which the first plurality of code objects occur in the first binary memory image. The system may also comprise generator software capable of generating difference information using the first binary image. The generator may employ the object order and the difference information in generating the updating information. The first plurality of code objects may comprise at least one of: a shared library, a component of the shared library, a device driver, a function, a subroutine, a compiled C module, a block of code, and a file. The system may also comprise a second binary memory image comprising a second plurality of code objects, the object ordering software processing the second binary image and the object order to determine a changed object order, the object ordering software reordering the second plurality of code objects based on the changed object order, and generating a reorganized second binary memory image, and the generator processing the first binary image and the reorganized second binary image in generating the difference information.

In a representative embodiment of the present invention, the system may also comprise linking software that is used to create the reorganized second binary image based on the changed object order and the second plurality of code objects, where the generator processes the first binary image and the reorganized second binary image to generate the difference information. The linking software may link code objects that are determined to have moved between the first binary memory image and the second binary memory image, in order to generate the reorganized second binary image. The linking software may link the second plurality of code objects based on the object order, to generate the reorganized second binary image. The linking software may link the second plurality of code objects based on the changed object order, to generate the reorganized second binary image. The object ordering software may store a copy of the object order as a stored object order that can be subsequently retrieved, and the object ordering software may process the second binary image and the stored object order to determine the changed object order. The object ordering software may employ linking software to link the second plurality of code objects and create a reorganized second binary image based on the changed object order, and the generator may process the first binary image and the reorganized second binary image in generating the difference information.

A representative embodiment of the present invention may also comprise a second binary memory image comprising a second plurality of code objects, and the object ordering software may be capable of storing and retrieving the object order. The object ordering software may process the second binary image to determine the second plurality of code objects, and the object ordering software may link the second plurality of objects based on the object order, using a linking tool, to create a reorganized second binary memory image. The generator may process the first binary image and the reorganized second binary image in generating the difference information. The object ordering software may comprise the linking software. The object ordering software may facilitate maintaining consistent object order between consecutive binary memory image builds. The electronic device may be one of: a mobile handset, a personal digital assistant, a pager, and a personal computer, and updating information may comprise an update package. In a representative embodiment of the present invention, updating information may comprise a set of executable instructions for converting, in the electronic device, a first code version to a second code version.

Additional aspects of the present invention may be observed in a method of generating updating information for updating at least one of: firmware and software in an electronic device. Such a method may comprise linking code objects for a first binary image using a first set of linker information, where the linking may produce first object mapping information. The method may also comprise linking code objects for a second binary image using a second set of linker information, where the linking may produce second object mapping information. The method may also comprise analyzing the first object mapping information and the second object mapping information to determine object order for code objects in the second binary image, generating updated linker information for linking code objects in the second binary image, and linking the code objects in the second binary image using the second linker information, to produce a final binary image. The method may also comprise generating updating information using the first binary image and the final binary image. The updating information may comprise an update package, and the updating information may comprise a set of executable instructions for converting a first version of code to a second version of code, in the electronic device. The electronic device may comprise one of: a mobile handset, a personal digital assistant, a pager, and a personal computer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for generating updating information for updating code in an electronic device, the system comprising:
a server including a processor and memory, the memory having stored thereon a first binary memory image comprising a first plurality of code objects wherein each of the plurality of code objects corresponds with a unique memory portion of a plurality of memory portions of the electronic device;
object ordering software executable on the processor, the object ordering software capable of determining an object order in which the first plurality of code objects occur in the first binary memory image according to their base address and configured to concentrate object ordering changes to a least number of sectors of the memory for minimizing a time it takes to update the information by configuring the object order with new objects being added to the end of the order, wherein the determining of object order is done based on memory layout and rules defined in a script file or scatter file;

generator software capable of generating difference information using the first binary image, wherein the difference information is generated by using the object order of the first plurality of code objects as a base to compare with an order in the updated plurality of code objects to determine objects not present and thereby considered to be difference information; and wherein the generator employs the object order and the difference information in generating the updating information.

2. The system according to claim 1, wherein the first plurality of code objects comprise at least one of: a shared library, a component of the shared library, a device driver, a function, a subroutine, a compiled C module, a block of code, and a file.

3. The system according to claim 1, further comprising: a second binary memory image comprising a second plurality of code objects; the object ordering software processing the second binary image and the object order to determine a changed object order; the object ordering software-reordering the second plurality of code objects based on the changed object order, and generating a reorganized second binary memory image; and the generator processing the first binary image and the reorganized second binary image in generating the difference information.

4. The system according to claim 3, further comprising: linking software that is used to create the reorganized second binary image based on the changed object order and the second plurality of code objects; and the generator processing the first binary image and the reorganized second binary image to generate the difference information.

5. The system according to claim 4, wherein the linking software links code objects that are determined to have moved between the first binary memory image and the second binary memory image, in order to generate the reorganized second binary image.

6. The system according to claim 4, wherein the linking software links the second plurality of code objects based on the object order, to generate the reorganized second binary image.

7. The system according to claim 4, wherein the linking software links the second plurality of code objects based on the changed object order, to generate the reorganized second binary image.

8. The system according to claim 3, wherein: the object ordering software stores a copy of the object order as a stored object order that can be subsequently retrieved; the object ordering software processes the second binary image and the stored object order to determine the changed object order; the object ordering software employs linking software to link the second plurality of code objects and create a reorganized second binary image based on the changed object order; and the generator processes the first binary image and the reorganized second binary image in generating the difference information.

9. The system according to claim 1, further comprising: a second binary memory image comprising a second plurality of code objects; wherein the object ordering software is capable of storing and retrieving the object order; wherein the object ordering software processes the second binary image to determine the second plurality of code objects; wherein the object ordering software links the second plurality of objects based on the object order, using a linking tool, to create a reorganized second binary memory image; and wherein the generator processes the first binary image and the reorganized second binary image in generating the difference information.

10. The system according to claim 9 wherein the object ordering software also comprises the linking software.

11. The system according to claim 9 wherein the object ordering software facilitates maintaining consistent object order between consecutive binary memory image builds.

12. The system according to claim 1, wherein the electronic device is one of:
a mobile handset, a personal digital assistant, a pager, and a personal computer.

13. The system according to claim 1, wherein updating information comprises an update package.

14. The system according to claim 1, wherein updating information comprises a set of executable instructions for converting, in the electronic device, a first code version to a second code version.

15. A method of generating updating information for updating at least one of: firmware and software in an electronic device, the method comprising:
linking code objects for a first binary image according to their base address using a first set of linker information, the linking producing first object mapping information;
linking code objects for a second binary image using a second set of linker information, the linking producing second object mapping information;
analyzing the first object mapping information and the second object mapping information to determine object order for code objects in the second binary image wherein each of the code objects corresponds with a unique memory portion of the electronic device, wherein the determining of object order is done based on memory layout and rules defined in a script file or scatter file;
concentrating object ordering changes to a least number of sectors of the memory for minimizing a time it takes to update the information;
generating updated linker information for linking code objects in the second binary image wherein the linker information is generated by using the object order of the first plurality of code objects as a base to compare with an order in the updated plurality of code objects to determine objects not present and thereby considered to be difference information;
linking the code objects in the second binary image using the second linker information, to produce a final binary image;
and maintaining locality of references within individual sectors of the memory by adding new objects at an end of the final binary image.

16. The method of claim 15, further comprising: generating updating information using the first binary image and the final binary image.

17. The method according to claim 16, wherein the updating information comprises an update package.

18. The method according to claim 16 wherein the updating information comprises a set of executable instructions for converting a first version of code to a second version of code, in the electronic device.

19. The method according to claim 15, wherein the electronic device comprises one of a mobile handset, a personal digital assistant, a pager, and a personal computer.

* * * * *

UNITED STATES PATENT AND TRADEMARK OFFICE
CERTIFICATE OF CORRECTION

PATENT NO. : 7,739,679 B2  Page 1 of 1
APPLICATION NO. : 11/100305
DATED : June 15, 2010
INVENTOR(S) : Iyad Qumei It is certified that error appears in the above-identified patent and that said Letters Patent is hereby corrected as shown below:

In column 11, lines 24-25, in Claim 3, delete "software-reordering" and insert -- software reordering --, therefor.

In column 12, line 50, in Claim 15, after "image;" insert -- and --.

In column 12, line 51, in Claim 15, before "maintaining" delete "and".

Signed and Sealed this

Twenty-sixth Day of October, 2010

David J. Kappos
*Director of the United States Patent and Trademark Office*